(12) United States Patent
Suzuki et al.

(10) Patent No.: US 8,806,936 B2
(45) Date of Patent: Aug. 19, 2014

(54) PROTECTION COVER STRUCTURE OF SLIDE DETECTION APPARATUS FOR VEHICLE SEAT

(75) Inventors: Yuya Suzuki, Toyota (JP); Tomoyuki Takase, Miyoshi (JP); Shinya Ando, Miyoshi (JP); Naoki Maeda, Tajimi (JP); Michinori Kakumu, Toyota (JP); Keiichiro Inoue, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 341 days.

(21) Appl. No.: 13/228,755

(22) Filed: Sep. 9, 2011

(65) Prior Publication Data

US 2012/0073369 A1    Mar. 29, 2012

(30) Foreign Application Priority Data

Sep. 29, 2010  (JP) .................................. 2010-218620

(51) Int. Cl.
*G01D 11/24* (2006.01)

(52) U.S. Cl.
USPC ........................................ 73/431; 324/207.24

(58) Field of Classification Search
USPC ........................................................... 73/431
See application file for complete search history.

(56) References Cited

U.S. PATENT DOCUMENTS

| | | | |
|---|---|---|---|
| 6,053,529 A * | 4/2000 | Frusti et al. ................... 280/735 |
| 6,593,735 B2 * | 7/2003 | Becker ..................... 324/207.26 |
| 6,798,196 B2 * | 9/2004 | Kojima et al. ........... 324/207.26 |
| 7,195,261 B2 * | 3/2007 | Yoshida et al. ............... 280/735 |
| 7,400,947 B2 * | 7/2008 | Endo et al. ......................... 701/1 |
| 7,564,234 B2 * | 7/2009 | Endoh et al. ............. 324/207.24 |
| 2002/0109063 A1 | 8/2002 | Jaudouin et al. |
| 2002/0145418 A1 * | 10/2002 | Becker ....................... 324/207.2 |
| 2003/0117000 A1 * | 6/2003 | Barnabo et al. ............ 297/217.1 |
| 2004/0004474 A1 * | 1/2004 | Kojima et al. ........... 324/207.24 |
| 2005/0021207 A1 * | 1/2005 | Endo et al. ....................... 701/49 |

(Continued)

FOREIGN PATENT DOCUMENTS

JP    2002-264701    9/2002
JP    2003-337004    11/2003

(Continued)

OTHER PUBLICATIONS

Japanese Office Action in corresponding Japanese Application No. 2010-218620, dated Apr. 15, 2014, along with English-language translation thereof.

*Primary Examiner* — Hezron E Williams
*Assistant Examiner* — Mark A Shabman
(74) *Attorney, Agent, or Firm* — Greenblum & Bernstein, P.L.C.

(57) ABSTRACT

A protection cover structure of a slide detection apparatus for a vehicle seat is provided. The slide detection apparatus is configured to detect a slide state of the vehicle seat with a magnetic detector which is provided to one of a fixed rail and a movable rail configuring a slide rail mechanism of the vehicle seat, and a detectable member provided to the other of the rails. The protection cover structure includes a protection cover provided to the one rail and configured to cover and protect the magnetic detector. The protection cover integrally includes a side cover part which covers a side of the magnetic detector, and a cover part which covers a detection part of the magnetic detector. A tip end portion of the cover part is formed with a lip-shaped contact part which is configured to slidably contact a sidewall surface of the other rail.

10 Claims, 4 Drawing Sheets

(56) References Cited

U.S. PATENT DOCUMENTS

2005/0062467 A1* 3/2005 Barnabo et al. ............ 324/207.2
2005/0225317 A1* 10/2005 Freeman .................... 324/207.2
2007/0170743 A1 7/2007 Kinoshita et al.
2009/0051356 A1* 2/2009 Nishide .................... 324/207.26

FOREIGN PATENT DOCUMENTS

| | | |
|---|---|---|
| JP | 2005-119499 | 5/2005 |
| JP | 2007-186104 | 7/2007 |
| JP | 4167139 | 8/2008 |

* cited by examiner

PROTECTION COVER STRUCTURE OF SLIDE DETECTION APPARATUS FOR VEHICLE SEAT

BACKGROUND OF THE INVENTION

1. Field of the Invention

The present invention relates to a protection cover structure of a slide detection apparatus for a vehicle seat.

2. Description of the Related Art

JP 4,167,139 B describes a protection cover structure of a slide detection apparatus for a vehicle seat, wherein a protection cover is attached to a magnetic detector mounted on a rail, thereby preventing magnetic foreign substances from being attached to the magnetic detector.

According to this protection cover structure, there is formed a gap between a lower end portion of a side cover part of the protection cover and a sidewall surface of the other rail. Therefore, the magnetic foreign substances are unintentionally introduced through the gap and thus attached to the magnetic detector, so that erroneous detection may be caused.

SUMMARY OF THE INVENTION

The present invention has been made in view of the above circumstances, and an object of the present invention is to provide a protection cover structure of a slide detection apparatus for a vehicle seat, which is capable of properly preventing magnetic foreign substances from being attached to a magnetic detector.

According to an illustrative embodiment of the present invention, there is provided a protection cover structure of a slide detection apparatus for a vehicle seat, the slide detection apparatus being configured to detect a slide state of the vehicle seat with a magnetic detector which is provided to one of a fixed rail and a movable rail configuring a slide rail mechanism of the vehicle seat, and a detectable member provided to the other of the rails. The protection cover structure includes a protection cover provided to the rail, to which the magnetic detector is provided, and configured to cover and protect the magnetic detector. The protection cover integrally includes a side cover part which covers a side of the magnetic detector, and a cover part which covers a detection part of the magnetic detector. A tip end portion of the cover part is formed with a lip-shaped contact part which is configured to slidably contact a sidewall surface of the other rail.

According to the above configuration, the side and the detection part of the detector are covered by the side cover part and the cover part of the protection cover, so that it is possible to properly prevent the magnetic foreign substances from being attached to the magnetic detector. In particular, the lip-shaped contact part formed at the tip end portion of the cover part is configured to slidably contact the sidewall surface of the other rail, so that it is possible to properly block a gap between the protection cover and the sidewall surface of the other rail. Accordingly, it is possible to properly prevent the magnetic foreign substances from being attached to the magnetic detector.

In the above configuration, the contact part of the cover part may be formed of a rubber material which can override a part of the detectable member provided on the sidewall surface of the other rail while contacting the detectable member and being elastically deformed.

According to the above configuration, the contact part of the cover part, which is formed of the rubber material, overrides a part of the detectable member while contacting the part and being elastically deformed. Therefore, it is possible to prevent the contact part of the cover part from being damaged due to collision with the part of the detectable member.

DETAILED DESCRIPTION

Hereinafter, illustrative embodiments of the present invention will be described with reference to the drawings.

A protection cover structure of a slide detection apparatus for a vehicle seat according to a first illustrative embodiment of the present invention is described with reference to the drawings.

Figure 1:
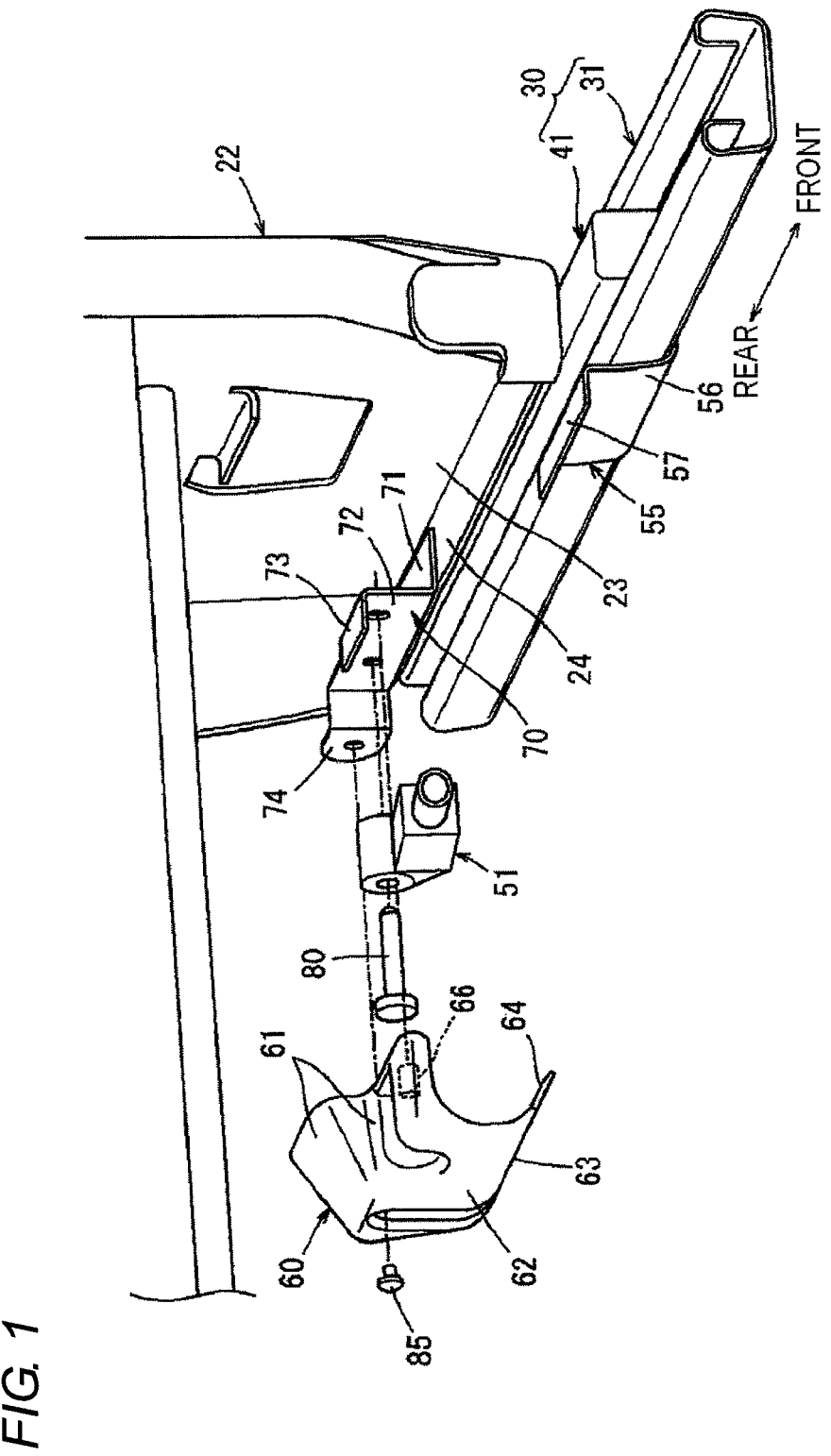
FIG. 1 is a perspective view showing a state before a magnetic detector and a detectable member of a slide detection apparatus and a protection cover are assembled to a slide rail mechanism of a vehicle seat according to an illustrative embodiment.
Figure 2:
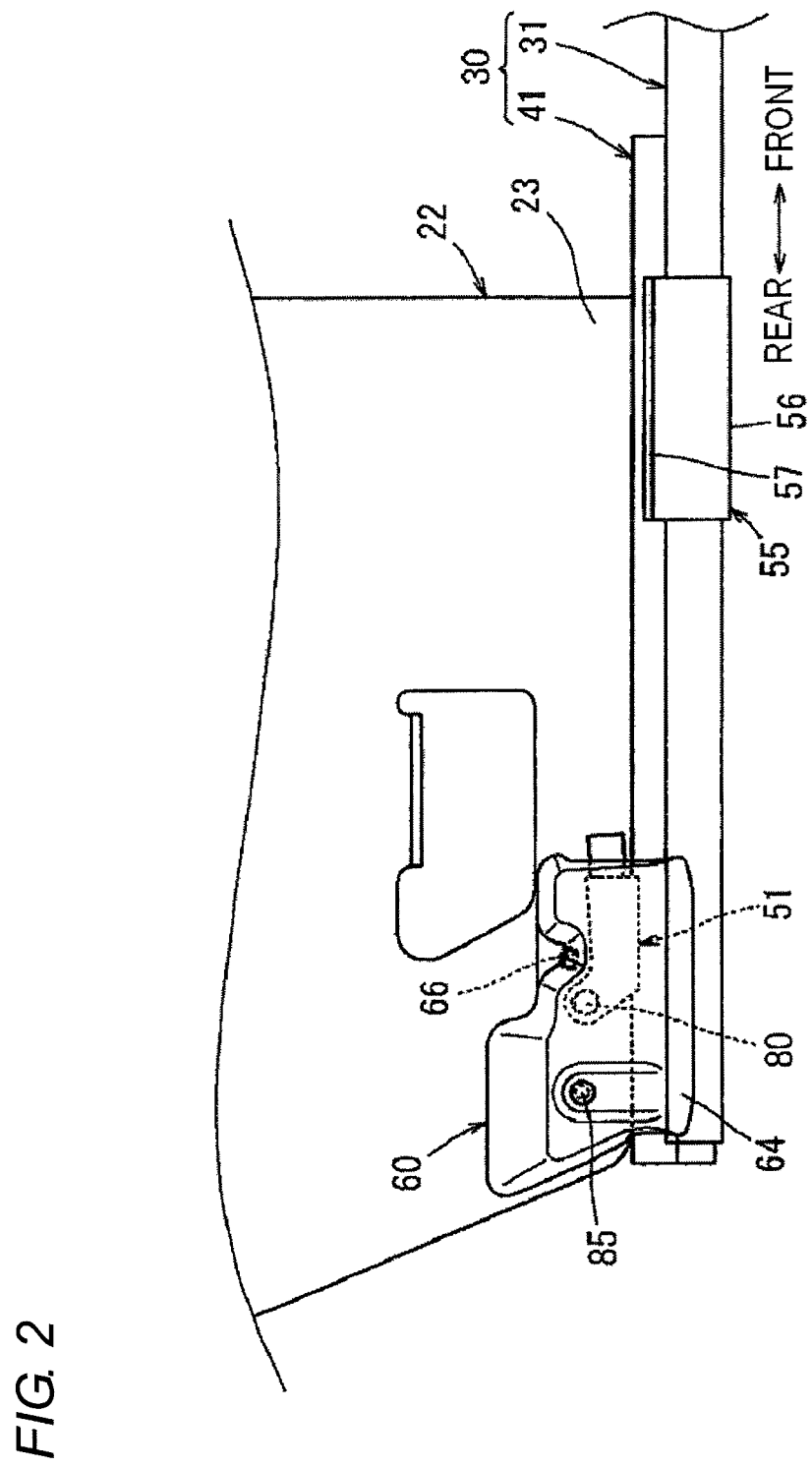
FIG. 2 is a side view showing a state where the magnetic detector and the detectable member of the slide detection apparatus and the protection cover are respectively provided to the slide rail mechanism of the vehicle seat.

As shown in FIGS. 1 and 2, a slide rail mechanism 30 is provided between a floor panel and a lower end portion of a side panel 23 of a seat cushion frame 22 of a vehicle seat. The slide rail mechanism 30 includes a fixed rail (lower rail) 31 that is fixed to the floor panel and a movable rail (upper rail) 41 that is fitted slidably in the front-rear direction along the fixed rail 31.

A slide detection apparatus for the vehicle seat includes a magnetic detector 51 that is provided to the movable rail 41, which is one of the fixed rail 31 and the movable rail 41, and a detectable member 55 that is made of magnetic material such as steel plate and is provided to the fixed rail 31, which is the other of the rails.

In the first illustrative embodiment, as shown in FIGS. 1 and 2, a bracket 70 is fixed on a lower bent piece 24 of the side panel 23, to which an upper plate part of the movable rail 41 is fixed. The bracket 70 includes a base plate part 71, a side plate part 72 and an upper plate part 73 and having a Z-shaped cross section, and is fixed to the lower bent piece 24 by a bolt and the like at the base plate part 71 such that the position of the bracket 70 in the front-rear direction can be adjusted.

The magnetic detector 51 is positioned and fixed to the side plate part 72 of the bracket 70 by an attaching bolt 80.

In the first illustrative embodiment, one end portion of the side plate part 72 of the bracket 70 in the front-rear direction is formed with an attaching piece 74 which protrudes in the left-right direction (width direction) to have a horizontal cross section of an inverted-L shape for fixing a protection cover 60 (described below).

As shown in FIGS. 1 and 2, the detectable member 55 is provided to one side of the fixed rail 31. The detectable member 55 is made of magnetic material such as steel plate and has an attaching part 56 and a detectable part 57. The attaching part 56 has an L-shaped cross section extending from a lower surface of the fixed rail 31 along a sidewall surface thereof. The detectable part 57 is formed by bending an upper end of the attaching part 56 in a horizontal direction.

When the vehicle seat is arranged in a front area (front position), the detectable part 57 of the detectable member 55 is detected by the magnetic detector 51. When the vehicle seat is arranged in a rear area (rear position), the detectable part 57 of the detectable member 55 is not detected by the magnetic detector 51.

Figure 3:
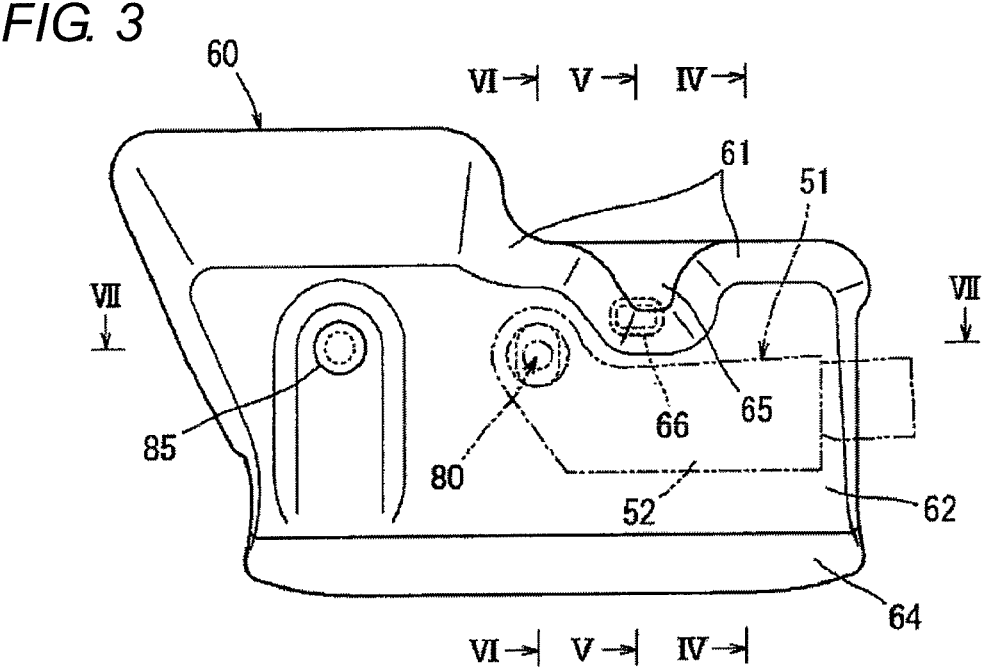
FIG. 3 is a side view showing the protection cover.
Figure 4:
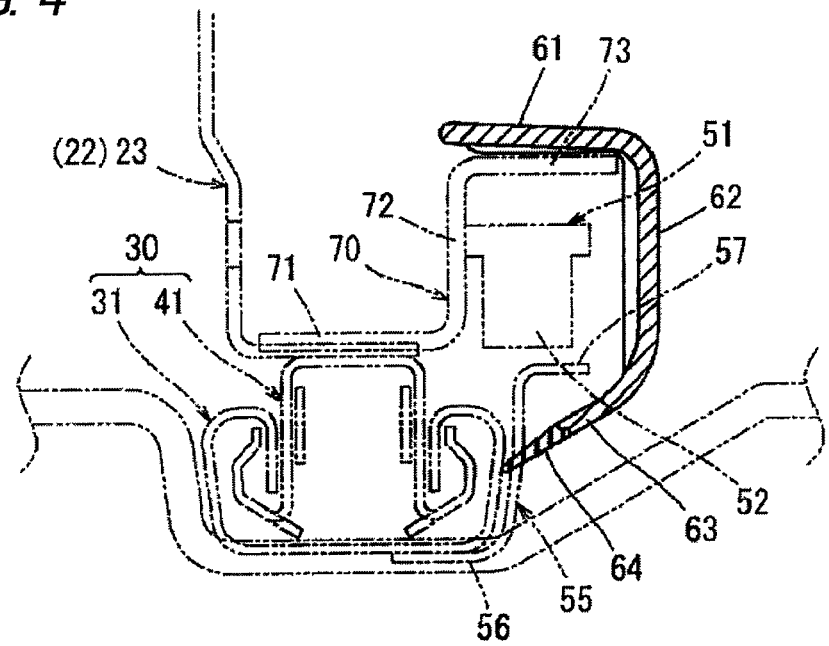
FIG. 4 is a longitudinal sectional view of the protection cover taken along a line IV-IV of FIG. 3.

As shown in FIGS. 3 and 4, the protection cover 60 integrally includes an upper cover part 61 that covers an upper part of the upper plate part 73 of the bracket 70, a side cover part 62 that covers a side of the magnetic detector 51 and a cover part 63 that covers a detection part 52 of the magnetic detector 51.

Figure 5:
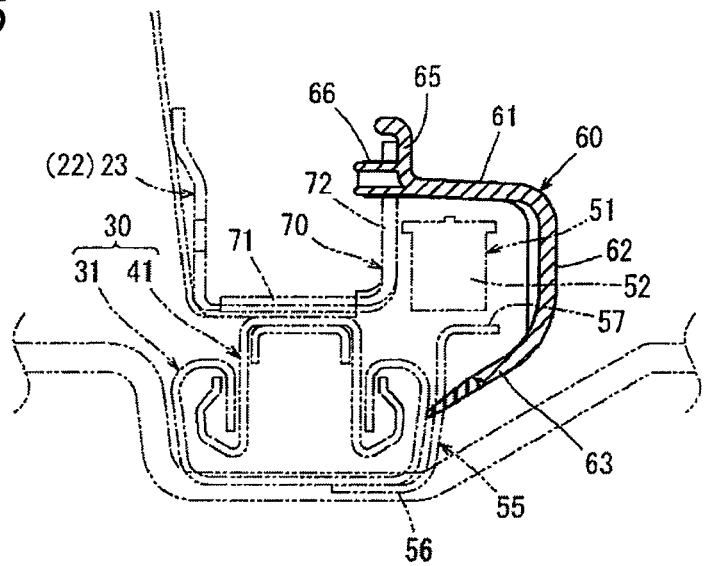
FIG. 5 is a longitudinal sectional view of the protection cover taken along a line V-V of FIG. 3.

Further, as shown in FIG. 5, an extending part 65 extends upwards along the side plate part 72 of the bracket 70 at a part of the upper cover part 61 of the protection cover 60 and a cylindrical positioning pin 66 that positions the protection cover 60 protrudes from the extending part 65.

Figure 7:
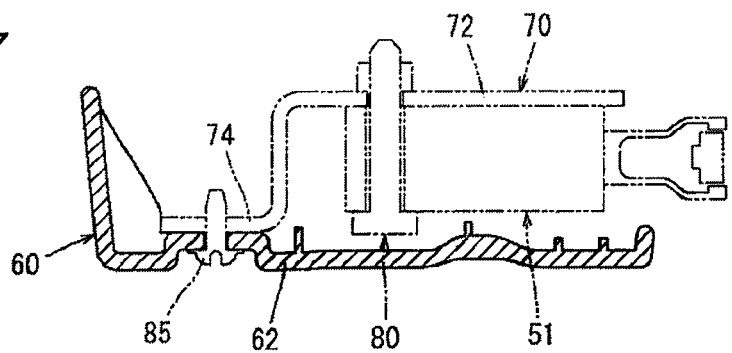
FIG. 7 is a horizontal sectional view of the protection cover taken along a line VII-VII of FIG. 3.

In a state where the positioning pin 66 is fitted in a positioning hole that penetrates the side plate part 74 of the bracket 70, a screw 85 is screwed into the attaching piece 74 of the bracket 70 through an attaching hole of the side cover part 62, as shown in FIG. 7. Thereby, the protection cover 60 is positioned and fixed to the bracket 70.

Figure 6:
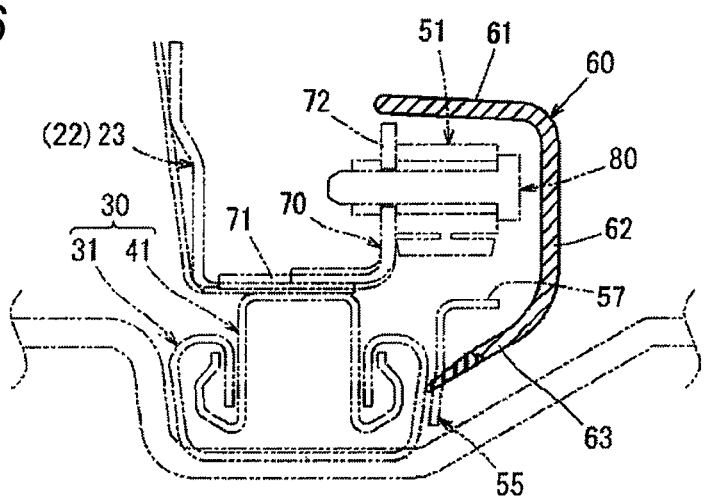
FIG. 6 is a longitudinal sectional view of the protection cover taken along a line VI-VI of FIG. 3.

As shown in FIGS. 4 to 6, a tip end portion of the cover part 63 of the protection cover 60 is integrally formed with a lip-shaped contact part 64 that is configured to slidably contact the sidewall surface of the fixed rail 31.

In the first illustrative embodiment, the contact part 64 of the cover part 63 is formed of a rubber material that can slide over a part of the detectable member 55 provided on the sidewall surface of the fixed rail 31 while contacting the part of the detectable member 55 and being elastically deformed. It is noted that the protection cover 60 is formed of a hard synthetic resin material having high rigidity except for the contact part 64. That is, the rigidity of the protection cover 60 except for the contact part 64 is higher than that of the contact part 64.

The protection cover structure of the slide detection apparatus for the vehicle seat according to the first illustrative embodiment is configured as described above. Accordingly, the vehicle seat is positioned as the movable rail 41 slides in the front-rear direction along the fixed rail 31 of the slide rail mechanism 30.

When the vehicle seat is arranged in the front area (front position), the detectable part 57 of the detectable member 55 is detected by the detection part 52 of the magnetic detector 51. When the vehicle seat is arranged in the rear area (rear position), the detectable part 57 of the detectable member 55 is not detected by the detection part 52 of the magnetic detector 51.

The protection cover 60 that covers the magnetic detector 51 has the side cover part 62 which covers the side of the magnetic detector 51 and the cover part 63 which covers the detection part 52 at a lower part of the magnetic detector 51. Thereby, it is possible to properly prevent magnetic foreign substances such as clip, hairpin, steel piece and the like from being attached to the magnetic detector 51.

Particularly, as shown in FIGS. 4 to 6, the contact part 64, which is formed at the tip end portion of the cover part 63 of the protection cover 60, is configured to slidably contact the sidewall surface of the fixed rail 31. Therefore, it is possible to block a gap between the protection cover 60 and the sidewall surface of the fixed rail 31. Accordingly, it is possible to effectively prevent the magnetic foreign substances from being attached to the magnetic detector 51.

Furthermore, the contact part 64 of the cover part 63 is formed of the rubber material and overrides a part of the detectable member 55 while keeping the contact state with the part and being elastically deformed. Therefore, it is possible to prevent the contact part 64 of the cover part 63 from being damaged due to collision with the part of the detectable member 55 and to effectively prevent the magnetic foreign substances from being attached to the magnetic detector 51.

While the present invention has been shown and described with reference to certain illustrative embodiments thereof, it will be understood by those skilled in the art that various changes in form and details may be made therein without departing from the spirit and scope of the invention as defined by the appended claims.

For example, in the above illustrative embodiment, the magnetic detector 51 is provided to the movable rail 41 and he detectable member 55 is provided to the fixed rail 31. However, the present invention is not limited thereto. That is, this arrangement may be opposite. Specifically, the magnetic detector 51 may be provided to the fixed rail 31 and the detectable member 55 may be fixed to the movable rail 41. However, it may be preferable to provide the magnetic detector 51 to the movable rail 41 since the magnetic detector 51 is further from the floor panel compared to when the magnetic detector 51 is provided to the fixed rail 31.

What is claimed is:

1. A protection cover structure of a slide detection apparatus for a vehicle seat, the slide detection apparatus being configured to detect a slide state of the vehicle seat with a magnetic detector which is provided to one of a fixed rail and a movable rail configuring a slide rail mechanism of the vehicle seat, and a detectable member provided to the other one of the fixed rail and the movable rail, the protection cover structure comprising:

a protection cover provided to one of the fixed rail and the movable rail, the protection cover being configured to cover and protect the magnetic detector such that an inner surface of the protection cover faces the magnetic detector, wherein the protection cover includes:

a side cover part which covers a side of the magnetic detector; and a cover part which covers a detection part of the magnetic detector, and wherein a tip end portion of the cover part is formed with a lip-shaped contact part which is configured to slidably contact a sidewall surface of the other one of the fixed rail and the movable rail such that the inner surface of the protection cover faces a detectable part of the detectable member.

2. The protection cover structure according to claim 1, wherein the contact part of the cover part is formed of a rubber material which elastically deforms to slide over a part of the detectable member provided on the sidewall surface of the other one of the fixed rail and the movable rail while contacting the detectable member.

3. The protection cover structure according to claim 1, wherein a rigidity of the protection cover except for the contact part is higher than a rigidity of the contact part.

4. A protection cover structure of a slide detection apparatus for a vehicle seat, the slide detection apparatus being configured to detect a slide state of the vehicle seat with a magnetic detector which is provided on a movable rail of a slide rail mechanism of the vehicle seat, and a detectable member provided on a fixed rail of the slide rail mechanism, the protection cover structure comprising:
  a protection cover provided to the movable rail and configured to cover and protect the magnetic detector,
  wherein the protection cover includes:
    a side cover part which covers a side of the magnetic detector; and
    a cover part which covers a detection part of the magnetic detector, and
    wherein a tip end portion of the cover part is formed with a lip-shaped contact part which is configured to slidably contact a sidewall surface of the fixed rail and cover a detectable part of the detectable member from a lower side thereof.

5. The protection cover structure according to claim 4,
  wherein the lip-shaped contact part of the cover part is a rubber material which elastically deforms to slide over a side part of the detectable member provided on the sidewall surface of the fixed rail while contacting the detectable member.

6. The protection cover structure according to claim 4,
  wherein a rigidity of the protection cover except for the contact part is higher than a rigidity of the contact part.

7. The protection cover structure according to claim 4, wherein a bracket is provided on the movable rail such that the magnetic detector and the protection cover are fixable thereto.

8. The protection cover structure according to claim 7, wherein the bracket is adjustably provided on an upper plate part of the movable rail and includes a base plate part, a side plate part and an upper plate part, and wherein the side plate part includes an attaching piece that extends from a rear-end side of the side plate part.

9. The protection cover structure according to claim 8, wherein the magnetic detector is connected to the bracket via the side plate part and the protection cover is connected to the bracket via the attaching piece.

10. The protection cover structure according to claim 8, wherein the protection cover covers the upper plate part of the bracket.

\* \* \* \* \*